June 20, 1933.  F. E. SCHWENTLER  1,914,619
TRUCK BRAKE RIGGING
Filed July 10, 1931  2 Sheets-Sheet 1
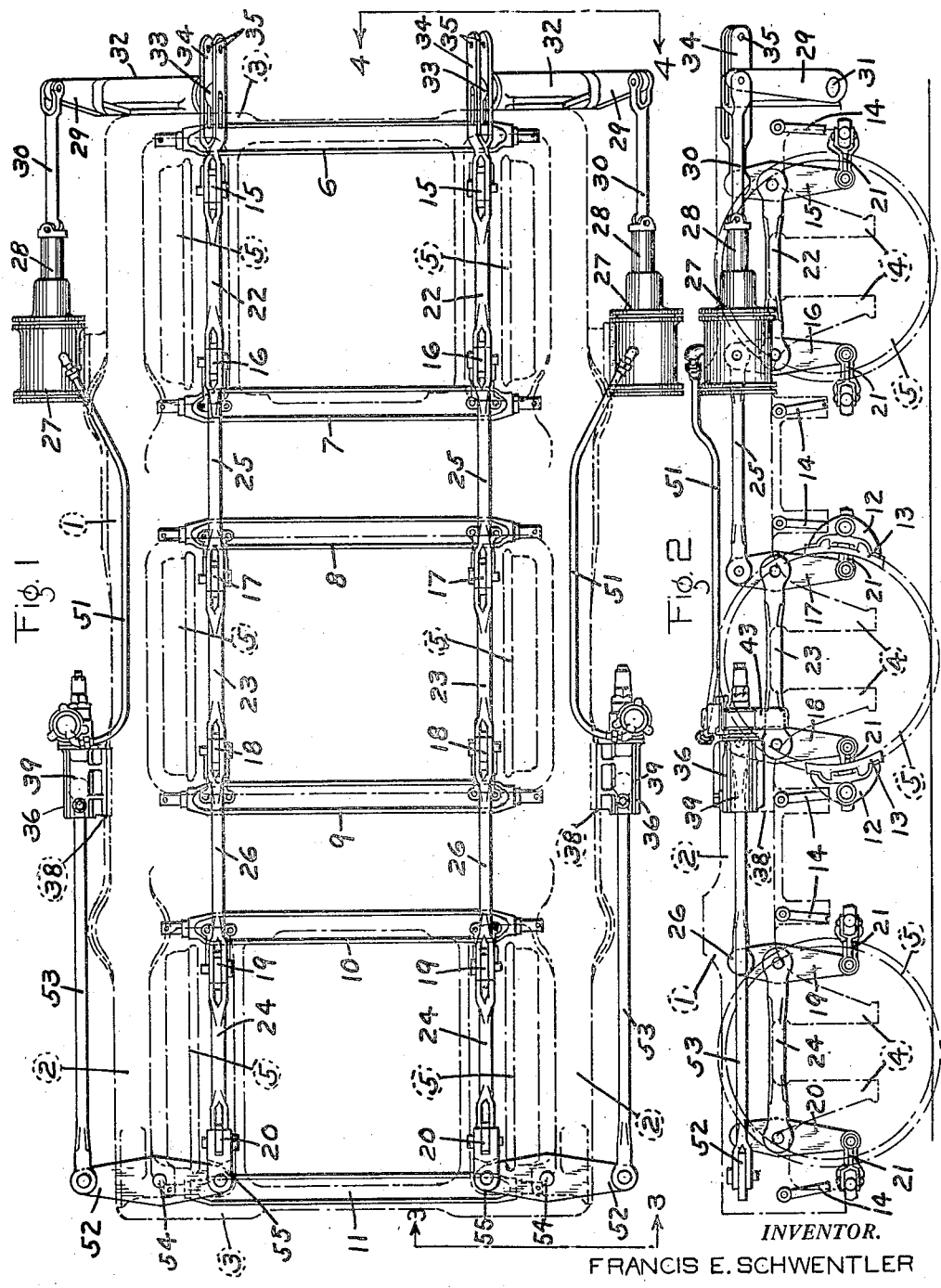
INVENTOR.
FRANCIS E. SCHWENTLER
By  Wm. M. Cady
ATTORNEY.

June 20, 1933. F. E. SCHWENTLER 1,914,619
TRUCK BRAKE RIGGING
Filed July 10, 1931 2 Sheets-Sheet 2
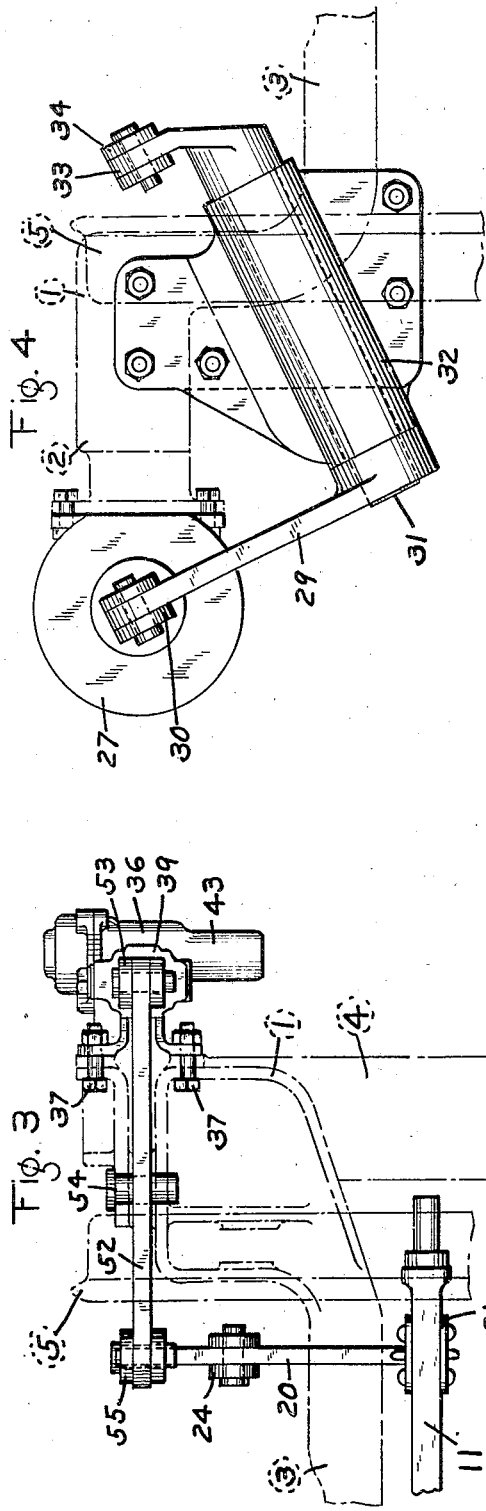
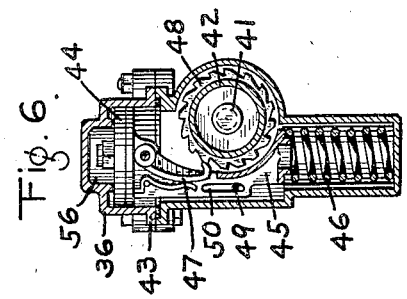
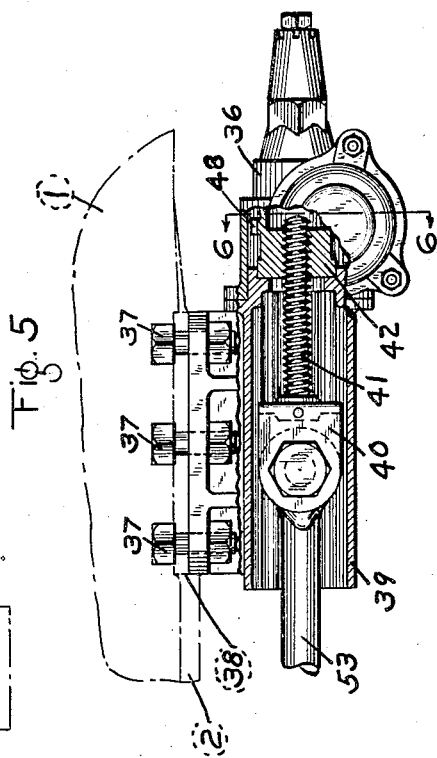
INVENTOR.
FRANCIS E. SCHWENTLER
By *Wm. M. Cady*
ATTORNEY.

Patented June 20, 1933

1,914,619

UNITED STATES PATENT OFFICE

FRANCIS E. SCHWENTLER, OF ST. LOUIS, MISSOURI, ASSIGNOR TO THE AMERICAN BRAKE COMPANY, OF ST. LOUIS, MISSOURI, A CORPORATION OF MISSOURI

TRUCK BRAKE RIGGING

Application filed July 10, 1931. Serial No. 549,818.

This invention relates to brake equipment for railway car trucks and more particularly to that type of equipment in which the brake shoes are operated by a brake cylinder device carried by the truck frame and in which the slack that may develop in the equipment is taken up by a slack adjuster carried by the truck frame.

The principal object of my invention is to provide an improved truck brake equipment of the above type which is of simple construction and efficient in operation and in which the brake cylinder device, slack adjuster and other operating mechanism connected therewith is kept close to the side of the truck frame.

A further object is to provide a compact truck brake equipment in which the brake cylinder device, slack adjuster and connections therefrom to the other parts of the equipment are readily accessible for adjustment, inspection and repair or replacement.

Other objects and advantages will appear in the following more detailed description of the invention.

In the accompanying drawings; Fig. 1 is a plan view of a truck brake equipment embodying my invention, the usual brake heads and shoes being omitted; Fig. 2 is a side elevational view of the same, the brake heads and shoes being shown applied to one wheel; Figs. 3 and 4 are enlarged end elevational views of the same as viewed in the direction of the lines 3—3 and 4—4 respectively, of Fig. 1; Fig. 5 is an enlarged fragmentary plan view, partly in section, of an automatic slack adjuster; and Fig. 6 is a sectional view of the same taken on the line 6—6 of Fig. 5.

In Figs. 1 to 5 inclusive, portions of the truck frame are shown in dot and dash lines.

In the drawings, my improved truck brake equipment is shown, for illustrative purposes only, as being of the clasp type and is further shown applied to a six wheel truck having a truck frame 1.

The truck frame 1 may be of any desired construction but as shown in the drawings, is of the usual cast metal type having longitudinally extending parallel side members 2 which are integrally connected by end members 3. Depending downwardly from the side members 2 and integral therewith are pairs of pedestals 4, each pair serving as guides for the usual journalling means (not shown) for the wheels 5.

The brake equipment may comprise brake beams 6, 7, 8, 9, 10 and 11 which are arranged one on either side of each pair of wheels and are each provided at each end with a brake head 12 having a brake shoe 13 secured thereto for engagement with the tread of one of the wheels 5. Only one pair of brake heads and shoes for one wheel is shown in the drawings, but it will be understood that there will be a pair of each for each wheel. The brake beams are supported from the truck frame 1 by the usual hangers 14.

In the present embodiment of the invention two sets of my improved equipment are employed, one set being arranged at either side of the truck and operatively connected to the brake beams. Both sets being substantially alike, only one will now be described in detail.

The equipment at either side of the truck comprises live brake levers 15, 16, 17, 18 and 19 and a dead lever 20, all of which are preferably disposed vertically and at their lower ends are pivotally connected to the respective brake beams 6, 7, 8, 9, 10 and 11 through the medium of clevis connections 21.

The brake levers 15 and 16 are operatively connected together, intermediate their ends, by a rod 22, and the levers 17 and 18 are, in a like manner, connected by a rod 23. The live lever 19 and dead lever 20 are operatively connected together, intermediate their ends, by a rod 24. The levers 16 and 17 are operatively connected together, at their upper ends, by a rod 25 and the upper ends of the levers 18 and 19 are connected, in the same manner, by a rod 26. These brake levers and rods may be supported upon the truck frame in the usual well known manner.

For operating the brake mechanism, a brake cylinder 27 is provided which is directly secured to one of the side members 2 of the truck frame and is preferably located some distance back from one end of the truck frame to insure maximum clearance conditions between the truck and adjacent parts of the car body.

The brake cylinder contains the usual piston (not shown) having a stem 28 which is operatively connected to the upper end of an angularly disposed operating arm 29 by a push rod 30. The lower or outer end of the operating arm 29 is secured to the lower end of an angularly disposed rotatable shaft 31 which is journalled in a bracket 32 secured to one of the end members 3 of the truck frame. Secured to the upper or inner end of the shaft 31 is an arm 33, the upper end of which is operatively connected to the upper end of the live lever 15 through the medium of a rod 34. The connection between the arm 33 and the rod 34 is such as to permit the rod 34 to move relative to the arm 33 when the brakes are being manually operated through the connections (not shown) which may be attached to the outer end of the rod 34, the openings 35 in the end of the rod being for the purpose of receiving the attaching means.

At or adjacent the transverse center line of the truck frame an automatic slack adjuster 36 is provided having a casing which is directly secured to the side member 2 by bolts 37. When the casing is thus secured one end thereof engages a shoulder 38 on the side member and by reason of such engagement prevents the bolts 37 from being subjected to shearing stresses when the brakes are applied.

The slack adjuster casing comprises a hollow portion 39 in which an adjustable fulcrum block 40 is slidably guided. For varying the position of the block 40, an adjusting screw 41 is provided which passes through a rotatable screw-threaded ratchet adjusting nut 42, the screw threads of the nut operatively engaging the screw threads of the adjusting screw 41.

The casing of the slack adjuster also comprises a cylinder 43 which, at one side of the adjusting nut 42, contains a piston 44 having a stem 45, which stem at its lower end is engaged by a coil spring 46.

Pivotally connected to the piston stem 45 is a pawl 47 which is adapted to operatively engage ratchet teeth 48 on the adjusting nut 42.

The piston 44 and pawl 47 are guided and maintained in their proper operating positions by means of a bolt or pin 49 secured in the casing and extending through an elongated slot 50 formed in the piston stem 45.

The piston chamber 56 which is at one side of the piston 44, is normally connected to non-pressure chamber of the brake cylinder by way of a pipe 51.

The fulcrum block 40 of the slack adjuster is operatively connected to the outer end of a horizontally disposed fulcrum lever 52 by a rod 53, said fulcrum lever being pivotally connected, intermediate its ends to the truck frame by a pin 54. The inner end of this lever is operatively connected to the upper end of the dead lever 20 by a clevis connection 55.

In operation, when fluid under pressure is supplied to the brake cylinders 27, the pistons thereof move to force the piston stems 28 outwardly, operating the systems of levers connected therewith and connected with the slack adjusters 36 to apply the brake shoes to the treads of the wheels 5.

Upon thus applying the brakes, if the movement of the brake cylinder piston of a brake cylinder exceeds the normal amount, due to wear of the brake shoes and slack in the other parts of the equipment, the piston will uncover a brake cylinder port which is open to the pipe 51, so that fluid under pressure will be supplied from the pressure side of the brake cylinder piston, through pipe 51, to the piston chamber 56 in the slack adjuster and the piston 44 will be operated to shift the pawl 47 to engage a tooth 48 of the adjusting nut 42.

When the brakes are released, fluid under pressure is released from the piston chamber 56, and the spring 46, which has been compressed, acts to retract the piston 44, so that the pawl 47 actuates the adjusting nut 42 to draw up the adjusting screw 41 and block 40, thereby operating the dead lever 20 to take up slack in the equipment.

While one illustrative embodiment of the invention has been described in detail, it is not my invention to limit its scope to that embodiment or otherwise than by the terms of the appended claims.

Having now described my invention, what I claim as new and desire to secure by Letters Patent, is:

1. In a truck brake equipment, the combination with a truck frame having side members, of a system of operatively connected brake levers carried by said frame, one of said brake levers being a dead lever, fulcrum means for said dead lever carried by one of said side members, means securing said fulcrum means to the side member, and an abutment on said side member against which said fulcrum means abuts to prevent the securing means from being subjected to shearing stresses when the system of brake levers is operated to apply the brakes.

2. In a truck brake equipment, the combination with a truck frame having side members, of a system of operatively connected brake levers carried by said frame, one of said brake levers being a dead lever and another of said levers being a live lever, a fulcrum lever pivotally connected intermediate its ends to said frame and having said dead lever connected to one end thereof, a slack adjuster secured to one of said side members, an adjustable block included in said slack adjuster, an adjusting rod directly connected at one end to the other end of said fulcrum lever and directly connected at the other end to said block, means operated by fluid under pressure for varying the position of said block to take up slack in the equipment, and a brake cylinder secured to the side member adapted to operate said live lever and to control the supply of fluid under pressure to said means.

3. In a truck brake equipment, the combination with a truck frame, of a system of operatively connected brake levers carried by said frame, one of said brake levers being a dead lever, a slack adjuster operatively connected to said dead lever and comprising a casing and a fulcrum member adjustably mounted in the casing, means for securing said casing to the truck frame, and means on the truck frame against which said casing abuts to prevent the securing means from being subjected to shearing stresses when the equipment is subjected to braking power.

4. In a truck brake equipment, the combination with a truck frame, of a system of operatively connected brake levers carried by said frame, one of said brake levers being a dead lever, a slack adjuster operatively connected to said dead lever and comprising a casing and a fulcrum member adjustably mounted in the casing, means for securing said casing to the truck frame, and means on the truck frame cooperating with said casing to prevent securing means from being subjected to shearing stresses when the equipment is subjected to braking power.

5. In a truck brake equipment, the combination with a truck frame, of a system of operatively connected brake levers carried by said frame, one of said brake levers being a dead lever, a slack adjuster mechanism operatively connected to the dead lever, means securing said slack adjuster mechanism to the truck frame and means on the truck frame cooperating with the slack adjuster mechanism for preventing the securing means from being subjected to shearing stresses when the equipment is subjected to braking power.

In testimony whereof I have hereunto set my hand, this 26th day of June, 1931.

FRANCIS E. SCHWENTLER.